(12) United States Patent
Usi

(10) Patent No.: US 9,070,297 B1
(45) Date of Patent: Jun. 30, 2015

(54) ADDITION AND SUBTRACTION TEACHING AID

(71) Applicant: Engracio Usi, Jersey City, NJ (US)

(72) Inventor: Engracio Usi, Jersey City, NJ (US)

(*) Notice: Subject to any disclaimer, the term of this patent is extended or adjusted under 35 U.S.C. 154(b) by 0 days.

(21) Appl. No.: 13/769,967

(22) Filed: Feb. 19, 2013

(51) Int. Cl.
*G09B 1/00* (2006.01)
*G09B 23/02* (2006.01)

(52) U.S. Cl.
CPC . *G09B 1/00* (2013.01); *G09B 23/02* (2013.01)

(58) Field of Classification Search
CPC ........................................................ G09B 23/02
USPC ........................................................... 434/206
See application file for complete search history.

(56) References Cited

U.S. PATENT DOCUMENTS

| | | | |
|---|---|---|---|
| 2,965,980 A * | 12/1960 | Day | 434/198 |
| 5,007,840 A | 4/1991 | Gaskell | |
| 5,083,793 A | 1/1992 | Sanford | |
| 5,413,484 A | 5/1995 | Banerjee, Sr. et al. | |
| 5,640,774 A | 6/1997 | Goldman | |
| 5,775,015 A | 7/1998 | Hourihan | |
| 5,827,067 A | 10/1998 | Perez | |
| 6,142,784 A | 11/2000 | Wood | |
| 6,358,059 B1 | 3/2002 | Li | |
| 6,659,774 B1 | 12/2003 | Ramos et al. | |
| 6,811,402 B1 | 11/2004 | Ritchie | |
| 7,182,342 B1 | 2/2007 | Fulton, Jr. | |
| 7,229,352 B2 * | 6/2007 | Bonito | 463/22 |
| 7,677,895 B2 | 3/2010 | Miller | |

OTHER PUBLICATIONS

"Spin Your Number Wheels," crayola.com, https://web.archive.org/web/20130106041144/http://www.crayola.com/lesson-plans/spin-your-number-wheels-lesson-plan/, Jan. 6, 2013.*
"Multiplication Clock," Scholastic, http://web.archive.org/web/20100207225606/http://www2.scholastic.com/browse/lessonplan.jsp?id=1220, Feb. 7, 2010.*
"Slide Rules," Star Center Antique Mall, https://web.archive.org/web/20080617074348/http://www.myantiquemall.com/sliderules/sliderules.html, Jun. 17, 2008.*

* cited by examiner

*Primary Examiner* — Robert J Utama
*Assistant Examiner* — Jennifer L Fassett
(74) *Attorney, Agent, or Firm* — Michael J. Feigin, Esq.; Feigin & Associates, LLC

(57) ABSTRACT

A device and method of use for carrying out addition and/or subtraction problems is disclosed. The device has two circular dials rotatable with respect to one another. Each dial has at least one set of sequential numbers, and at least one selector allows for selection of a number on at least one of the dials. By rotating the circular dials in position, and selecting a number to be added or subtracted, one then is able to see correct mathematical equations around the entire circle.

9 Claims, 5 Drawing Sheets

ADDITION AND SUBTRACTION TEACHING AID

FIELD OF THE DISCLOSED TECHNOLOGY

The disclosed technology relates generally to math instruction, and, more specifically, to a device with two rotating wheels and hands for teaching addition and subtraction.

BACKGROUND OF THE DISCLOSED TECHNOLOGY

The ability to add and subtract is an essential component of a child's education in almost every society in order to succeed. Addition and subtraction are a critical indicator of a child's early success in school, which often determines his or her placement in a higher or lower level math class. More than half of a child's first grade math instruction is typically that of addition and subtraction. One of the customary tools used to teach children to add and subtract is a number line. This is simply a picture of a straight line on which every point is assumed to correspond to a real number and every real number to a point. However, there is a never-ending need to find ways to engage children in fun ways to learn math, so that they will excel and advance in their studies and, ultimately, life endeavors.

SUMMARY OF THE DISCLOSED TECHNOLOGY

In one embodiment of the disclosed technology, a circular mathematical calculation device has an outer wheel, an inner wheel, and a first selector, all rotatable around a center point. The outer wheel has two outer sets of sequential integers extended circumferentially around the outer wheel, such that a first outer set of the two sets sequentially increases in an opposite direction of a second outer set of the two sets. The inner wheel has two inner sets of sequential integers, a lowest number of a second inner set of the two inner sets is incremented by one over a highest number of a first inner set of the two inner sets. The first selector is configured to allow selection of a single digit of either the first outer set or the second outer set of sequential integers. while blocking from view a digit of a non-selected outer set of sequential integers.

In further embodiments, a second selector is employed, and the first selector is configured to allow selection of a single digit of the first outer set of sequential integers, while the second selector is configured to allow selection of a single digit of the second outer set of sequential integers while blocking from view a digit of a non-selected outer set of sequential integers. A first pointer, rotatable around the central point and configured to point towards numbers of the first inner set of sequential integers may be used, as may a second rotatable pointer, the second pointer configured with a portal showing a number of the second inner set of sequential integers. The selectors may be configured such that one is used for addition, while the other is used for subtraction.

In a method of arranging multiple addition or subtraction problems with correct answers, the method is carried out by way of designating a starting number on an outer circle, wherein the number of the outer circle is a number in a sequence of numbers extending around the outer circle. Then, one decides whether to add or subtract (if only one option is available, this is the option decided upon, but where two options are available, the user decides which operation to carry out). Then, a respective selector is rotated to select an amount to be added or subtracted on the outer circle. An inner circle is then rotated (over the outer circle) until a number representing a mathematical solution is in a desired position. Based on rotating everything in place to create a correct mathematical equation with solution, at least one other answer to a(nother) mathematical equation is determined, based on reading numbers which are aligned around a circular midpoint at a location other than where said selector was rotated to.

The "designating" is carried out by way of pointing a rotatable pointer at the starting number, in an embodiment of the disclosed technology. The outer circle may have two sets of sequential numbers, a first set incremented clockwise and a second set decremented clockwise, such that the first set is used for addition and second set used for subtraction. When rotating a respective selector to select an amount to be added on the outer circle, the amount may be selected from one set of sequential numbers while an amount from the other said set of sequential numbers is blocked by the selector.

The desired position of the solution is aligned with a position of the selector, in an embodiment, the position of the selected one determined because it was rotated to select an amount to be added or subtracted on said outer circle.

The inner circle may comprise two concentric sets of sequential numbers, a first set of concentric sets having lower values than the second set of sequential numbers. A further step of selecting from one of two pointers may be carried out, a first pointer adapted to select a number of the first concentric set of sequential numbers, and a second pointer adapted to select a number of the second concentric set of sequential numbers.

DETAILED DESCRIPTION OF EMBODIMENTS OF THE DISCLOSED TECHNOLOGY

The disclosed technology described herein provides a device and method of use for carrying out addition and/or subtraction problems. The device has two circular dials rotatable with respect to one another. Each dial has at least one set of sequential numbers, and at least one selector allows for selection of a number on at least one of the dials. By rotating the circular dials in position, and selecting a number to be added or subtracted, one then is able to see correct mathematical equations around the entire circle. For example, when 12 digits are spaced around each circle, one can view up to 12 correct mathematical equations. When using the dials for subtraction, one series of numbers is sequenced in the direction opposite to that of the other set, and when the sum is greater than the sequence on the dial used to sum the digits, a second sequence of numbers continues, concentric to the first sum set, in order to allow for addition around the entire dial.

Embodiments of the disclosed technology will become clearer in view of the forthcoming description of the figures.

Figure 1:
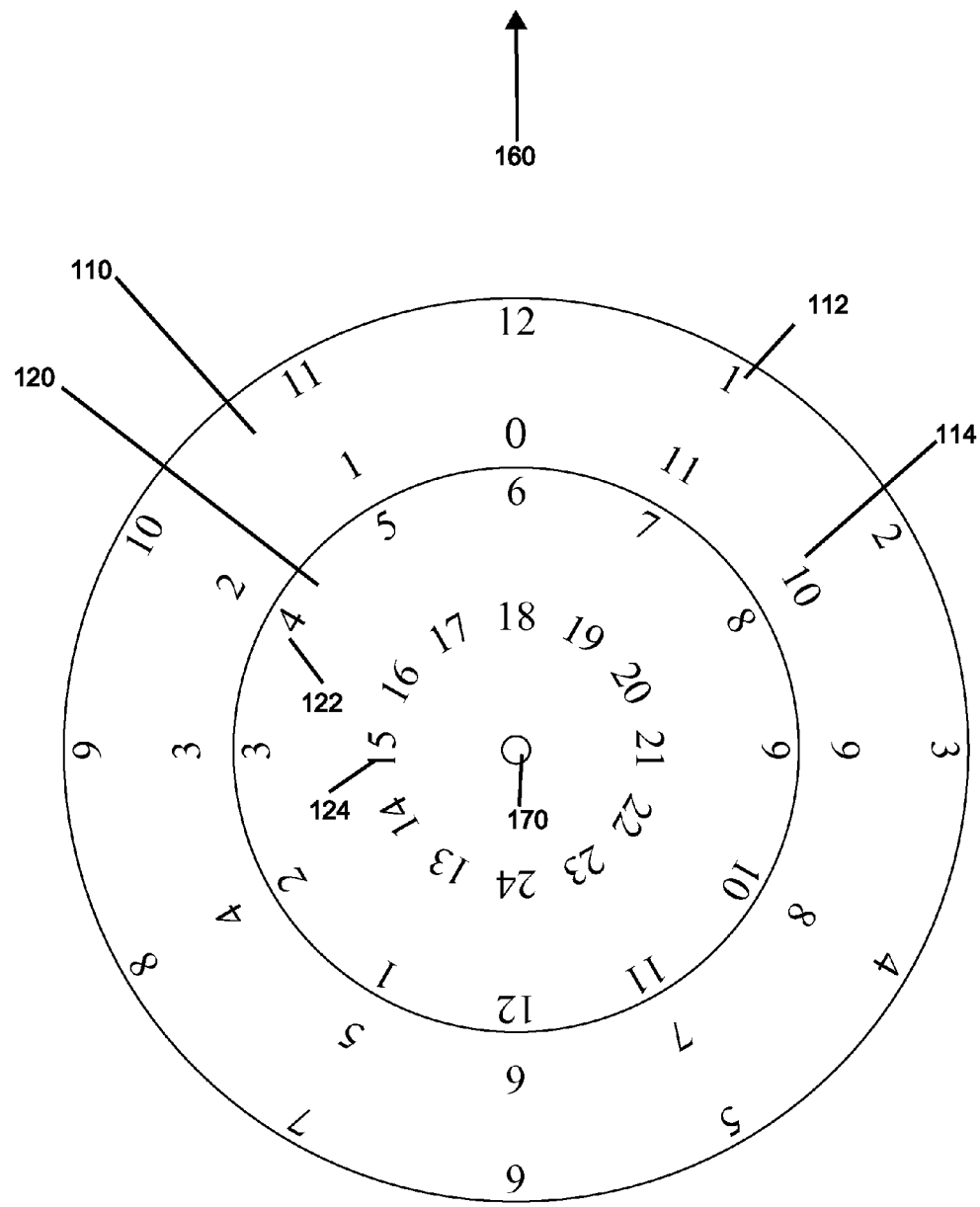
FIG. 1 shows two numbered wheels with two sets of numbers each, used in an embodiment of the disclosed technology.
Figure 3:
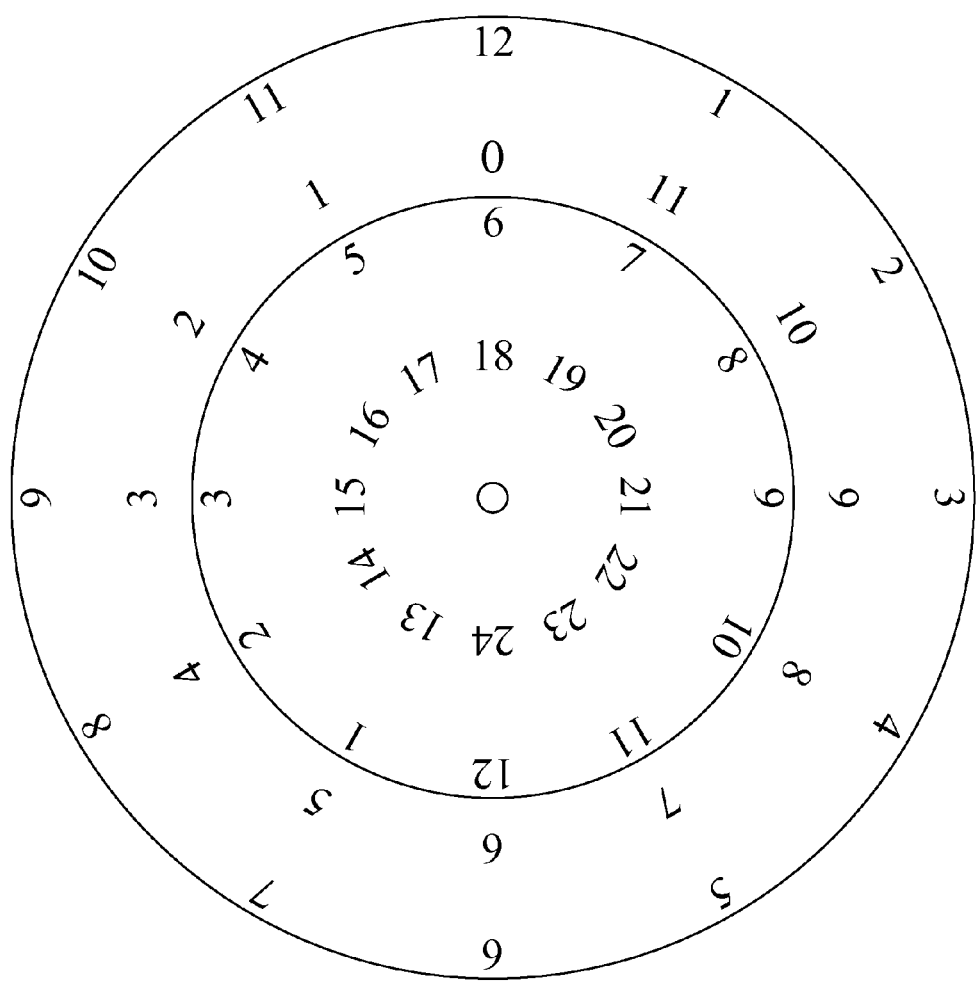
FIG. 3 is a version of FIG. 1 without figure labels, shown for clarity purposes.

FIG. 1 shows two numbered wheels with two sets of numbers each, used in an embodiment of the disclosed technology. FIG. 3 is a version of FIG. 1 without figure labels, shown for clarity purposes. Two wheels are used, outer wheel 110 with start circle 112 and subtraction circle 114, and inner wheel 120 with answer circles 122 and 124. The circles are held together by a fastener at a central point 170, creating a center point of each respective circle, such that the outer circle 110 and inner circle 120 rotate with respect to each other. A user rotates the circles in use. For purposes of this disclosure, and further, as used in the practice, as will be described below, direction line 160 is defined as the "top." Though calculations need not necessarily be performed based on circling the dial or dials relative to the top, the explanation below will proceed accordingly for ease of understanding.

The start circle 112 has numbered digits like a clock from 1 to 12, each separated from the next by 30 degrees, such that the 12 numbers cover the circle entirely, in a clockwise direction. The subtraction circle 114 proceeds similarly, except in the counter-clockwise direction and using the numbers 0 to 11 rather than 1 to 12. (It should be understood that mathematical equivalents of what is disclosed are also within the claim scope—for example, the clockwise/counter-clockwise nature of the circles could be reversed, the numbers could line up differently, and/or the position on the outer wheel 110 of the start circle 112 and subtraction circle 114 could be reversed.)

On the inner wheel 120, the answer or resultant circles 122 and 124 are also spaced apart 30 degrees from each other, with numbers from 1 to 12 in the answer circle 122, and numbers 13 to 24 in the answer circle 124.

In the embodiment shown, the answer circles will be lined up such that each number of the inner circle is greater by 12 than a correspondingly placed answer in the outer circle. The direction (clockwise or counter-clockwise) of the answer circle is the same as the direction of the start circle and opposite the direction of the subtraction circle. Thus, as shown, the answer circles 122 and 124 are clockwise. Still further, it should be understood that any number of equally-spaced digits around the circles 112, 114, 122, and 124 may be used, so long as the same number of digits is used in each circle and the digits are incremented/decremented according to the format described herein.

Figure 2:
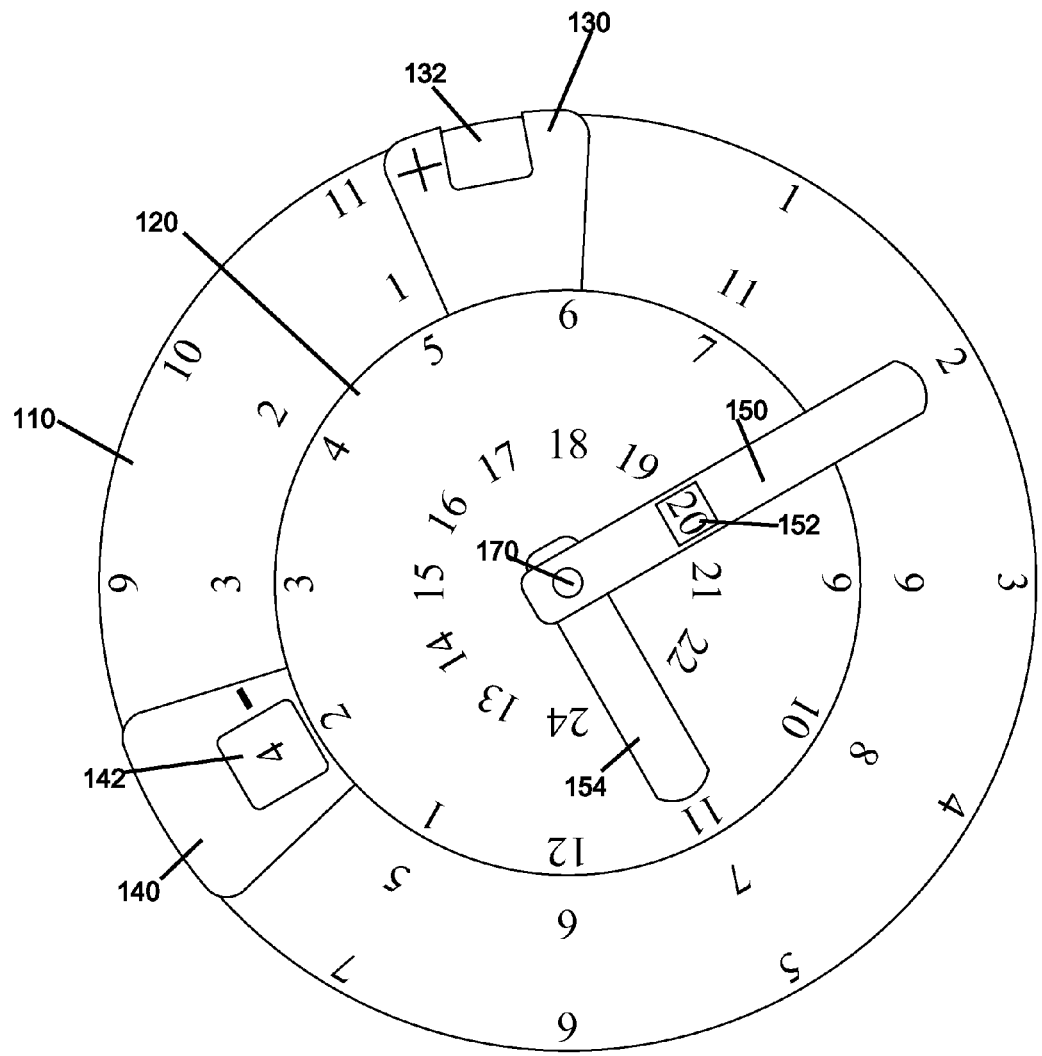
FIG. 2 shows the numbered wheels of FIG. 1, along with circumferentially moving selectors and pointers used in an embodiment of the disclosed technology.
Figure 4:
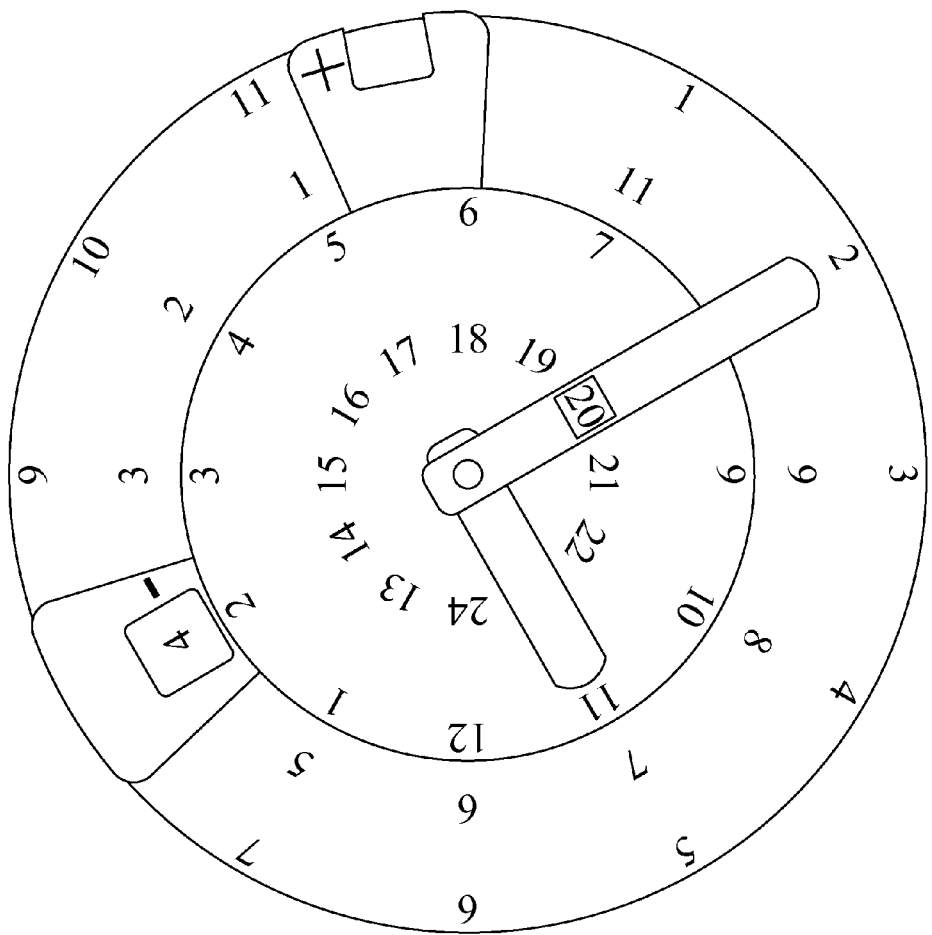
FIG. 4 is a version of FIG. 2 without figure labels, shown for clarity purposes.

FIG. 2 shows the numbered wheels of FIG. 1 along with circumferentially moving selectors and pointers used in an embodiment of the disclosed technology. FIG. 4 is a version of FIG. 2 without figure labels, shown for clarity purposes.

Here, the circumferentially moving selectors (pointers) 130 and 140 and hands 150 and 154 are shown, the hands being connected and movable about the same central axis 170 as the outer wheel 110 and the inner wheel 120. The circumferentially moving selectors include an addition selector 130 and subtraction selector 140. In the embodiment shown, each has a selection region 132 and 142, respectively, while blocking out a number from the opposite line, and hand 150 has a selection region 152. Thus, selection region 132 displays one of the numbers on the start circle 112, while the selector 130 itself blocks out the number on the subtraction circle 114 which is aligned with (at the same degree angle offset from the top direction 160) the selected number. Similarly, the selection region 142 displays one of the numbers on the subtraction circle 114, while the selector 140 itself blocks out the number on the start circle 112 which is aligned with (at the same degree angle offset from the top direction 160) the selected number.

Now referring to FIGS. 1 through 4 jointly, one adds together numbers by positioning the first number of the additional circle 112 to be added in the 160 direction. As an example, not specifically illustrated in the drawings, let the user place "1" in the 160 direction. Then, one places the addition selector 130 such that the selection region 132 shows the number to be added. In the present example, let the user place the addition selector 130 such that it selects the number "2". Now, the inner wheel 120 must be rotated such that the answer circle 122 displays a correct result of "3" at the same degree offset from the top 160 as the addition selector 130. In simpler terms, the correct answer on the inner circle 120 is aligned with the addition selector 130. Thus, in this example, the "3" on the answer circle would be aligned with the "2" selected by the selector for a correct mathematical equation of "1+2=3." Now, going around the circle, correct answers will be found around all 360 degrees/12 numbers, since each number is incremented by 1 on each of the start circle 112 and answer circle 122. Thus, a child (or adult) who knows "1+2=3" would be able to make this equation and then see the following, going around the circle in 30 degree increments: "1+3=4", "1+4=5", "1+5=6," and so forth until "1+11=12." At this point, the numbers have run out on the answer circle 122, so then the inner answer circle 124 is used for additional answers. So the last equation, which would be at 30 degrees to the left of direction 160 (or 330 degrees to the right) would be "1+12=13." Thus, one can explore the numbers and see how addition works by varying the problem, going around the circle.

Subtraction works much the same way, except that one would go around the circle in the opposite direction. As an example, not shown in the drawings, starting with the number "11" on the start circle 112 this number "11" is aligned with the top direction 160. Then, supposing the child understands that "11−1=10," the child places the subtraction selector 140 such that the selection region 142 shows the number "1." Thus, the equation "11−1" is being calculated, and thus, the number "10" from the answer circle 122 should be aligned by the user with the subtraction selector 140. Though the start circle position and subtraction selector are aligned in this case (both pointing in direction 160), the math works just the same. Now, the child (or adult) can follow around the circle, and, from a simple equation that he or she knows ("11−1=10"), he can see also, by following around the circle, that "11−2=9", "11−3=8," all the way to "11−10=1" and "11−11=0." This may be found simply by following around the circle in either direction and always starting with the start circle 112. When subtracting, the next number in the equation is always on the subtraction circle 114 (when adding, the next number is always also on the start circle), and the answer is on the inner circle 120. So as long as the first equation is lined up correctly, one can find the answers for up to eleven other mathematical equations.

Figure 5:
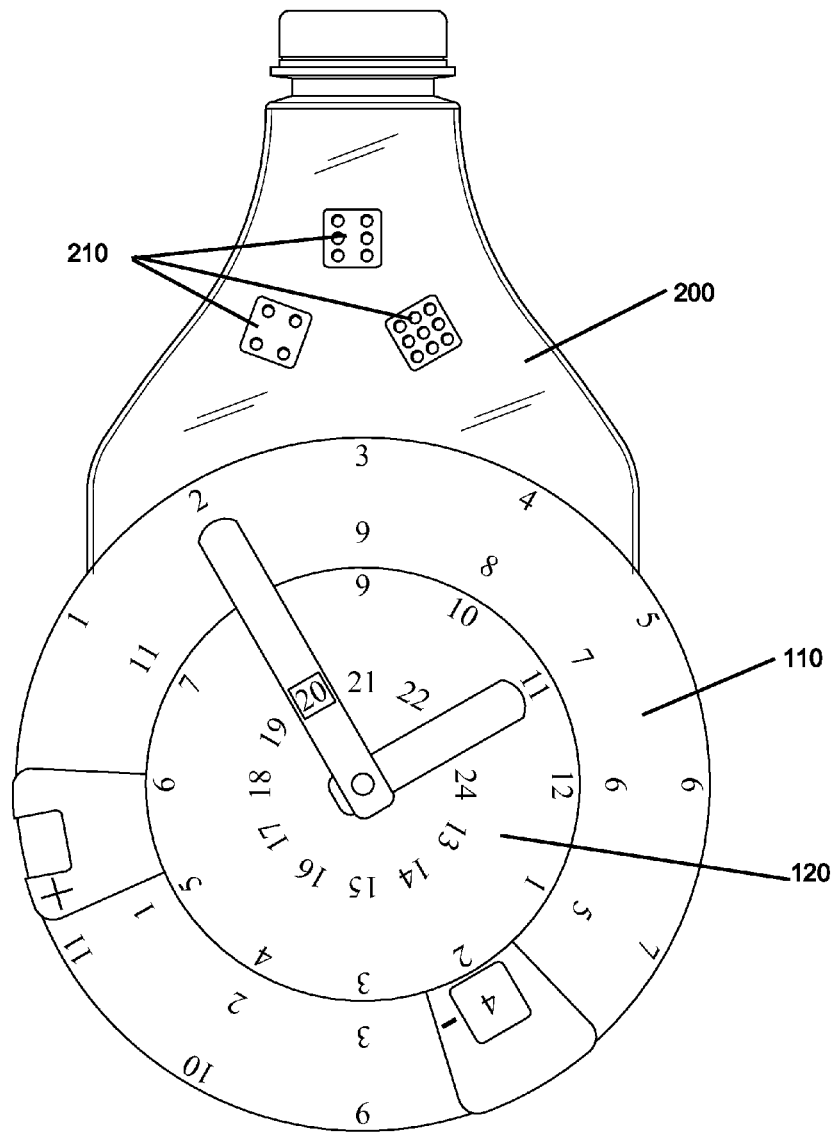
FIG. 5 shows the numbered wheels of FIGS. 1-4 attached to a shaker with free floating dice.

FIG. 5 shows the numbered wheels of FIGS. 1-4 attached to a shaker with free floating dice. The shaker 200 may be a bottle or other translucent or transparent device. It is a form of random selector, any type of which may be used in embodiments of the disclosed technology. In the shaker 200 are three dice 210 (randomized selectors which are movable within the shaker) used to select numbers. The dice may be different colors and may indicate or add up to the numbers 1 through 12. Using the randomized selection of numbers, one can devise a number of math problems to be carried out on the device, described with respect to FIGS. 1-4.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A circular mathematical calculation device, comprising:
   an outer wheel, an inner wheel, and at least one selector all rotatable around a center point;
   said outer wheel comprising first and second outer sets of sequential integers extended circumferentially around said outer wheel, wherein said first outer set of sequential integers increases in a first direction, and said second outer set of sequential integers increases in a second direction, opposite to said first direction;
   said inner wheel comprising first and second inner sets of sequential integers, a lowest number of said second inner set is incremented by one over a highest number of said first inner set, said first and second inner sets increasing sequentially in the same direction;
   said at least one selector is configured to allow selection of a single digit of either said first or second outer set of sequential integers, while blocking from view a digit of a non-selected outer set of sequential integers, said selected single digit to be combined with a second digit of the same one of said first or second outer sets to form a mathematical problem, and
   said inner wheel is configured to be rotated relative to said outer wheel such that a known solution to said formed mathematical problem is aligned with said at least one selector, and thereby to provide multiple additional correct mathematical equations in additional locations aligned around said inner and outer wheels.

2. The circular mathematical calculation device of claim 1, said at least one selector comprising a first selector and a second selector wherein said first selector is configured to allow selection of a single digit of said first outer set of sequential integers, and said second selector is configured to allow selection of a single digit of said second outer set of sequential integers, while blocking from view a digit of a non-selected outer set of sequential integers.

3. The circular mathematical calculation device of claim 2, wherein said first selector is configured for use with addition.

4. The circular mathematical calculation device of claim 2, wherein said first selector is configured for use with subtraction.

5. The circular mathematical calculation device of claim 1, wherein said circular mathematical calculation device is part of a shaker, said shaker comprising a hollow interior having a plurality of moveable selectors disposed therein.

6. The circular mathematical calculation device of claim 5, wherein said plurality of moveable selectors disposed within said hollow interior comprise at least two dice.

7. The circular mathematical calculation device of claim 1, wherein said alignment of said inner wheel to said known solution is configured to provide at least ten said additional correct mathematical equations.

8. The circular mathematical calculation device of claim 1, wherein said mathematical problem together with said known solution and said additional correct mathematical equations are all addition equations, all of which include a first identical addend, different second addends, and different sums.

9. The circular mathematical calculation device of claim 1, wherein said mathematical problem together with said known solution and said additional correct mathematical equations are all subtraction equations, all of which include an identical minuend, different subtrahends, and different differences.

\* \* \* \* \*